No. 889,356. PATENTED JUNE 2, 1908.
C. R. CARPENTER.
GUARD FOR FISH HOOKS.
APPLICATION FILED JAN. 24, 1907.
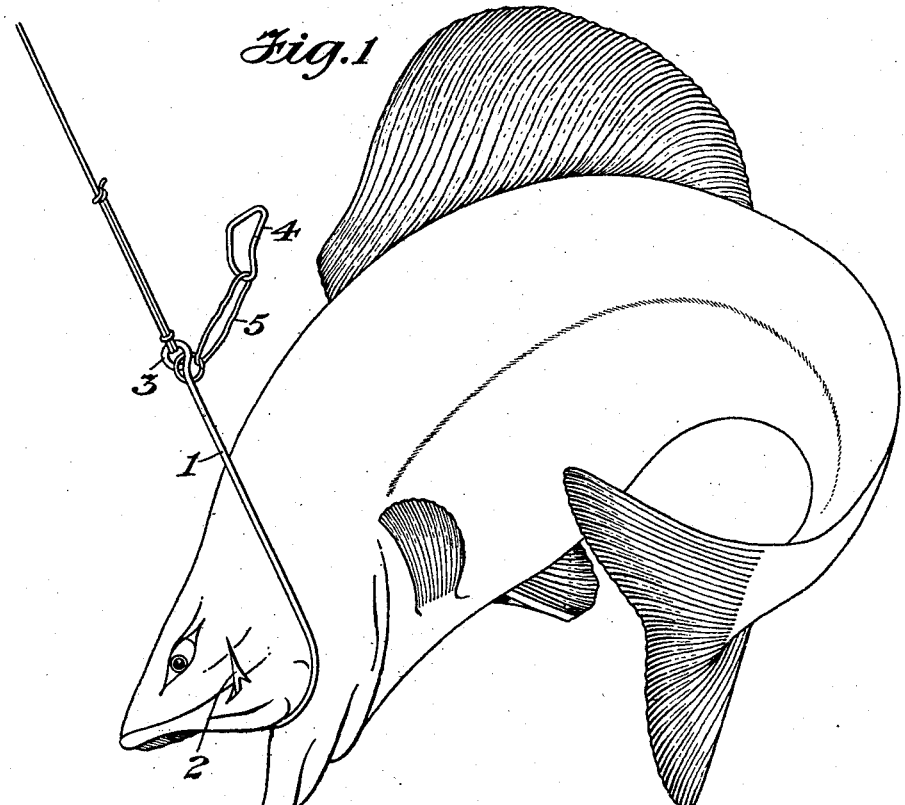
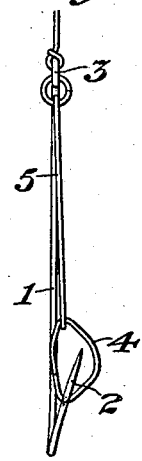
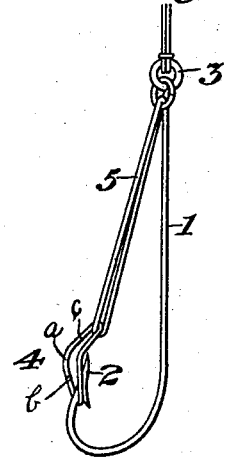
WITNESSES
Chas. F. Clagett
B. W. Couldock
INVENTOR
C. R. Carpenter
BY
Lewis J. Doolittle
ATTORNEY

UNITED STATES PATENT OFFICE.

CHARLES R. CARPENTER, OF RACINE, WISCONSIN.

GUARD FOR FISH-HOOKS.

No. 889,356.　　　　　Specification of Letters Patent.　　　　Patented June 2, 1908.

Application filed January 24, 1907. Serial No. 353,879.

*To all whom it may concern:*

Be it known that I, CHARLES R. CARPENTER, a citizen of the United States, and resident of Racine, in the county of Racine and State of Wisconsin, have invented certain new and useful Improvements in Guards for Fish-Hooks, of which the following is a specification.

This invention relates to a device adapted to be used in connection with a fish-hook of ordinary construction, the object being to prevent the point of the hook from catching in weeds or other obstructions in the water when the same is thrown, but which shall at the same time not interfere with the fish getting hooked.

To accomplish these results in my invention I have provided a device which may be designated as a weed-guard and which may be placed over the pointed end of the hook and held in position by a resilient member, such as a rubber band, attached at one end to the eye of the hook and at the other end to the guard. This resilient member is of such a length that when the guard is placed in position on the point or barb of the hook as described the same will be under tension and, consequently, will hold the guard in position. The guard itself is so formed that when the same is held in position on the barb of the hook as described a portion of the same bends outwardly away from the hook and so prevents the point from catching in the weeds as the same is drawn through the water.

The guard is preferably made of wire bent in a form similar to that shown in the drawings and is of relatively small size. A soft rubber band forms a convenient means of holding the same in position on the point of barb of the hook to prevent catching in the weeds but at the same time as soon as the hook is grasped by the fish, his mouth coming in contact with the soft rubber band or guard causes the same to be released and fly back out of the way the instant his jaws close upon the hook. The guard is easily removed for baiting the hook and as easily replaced in position.

It will be readily understood that this device is adapted for use with any kind or type of hook and the same guard may be quickly removed from one hook and placed on another if desired, it being only necessary to use an ordinary rubber band of proper length to give the required tension for hooks of different sizes.

In the drawings accompanying this specification I have illustrated one form of guard as applied to an ordinary fish-hook to illustrate my invention.

Like parts in the several views have been given similar reference numbers.

Figure 1 is a general view showing a fish-hook provided with a guard which has been displaced from its position on the barb of the hook by the fish grasping the same. Fig. 2 is a front elevation of a fish-hook showing the guard in position on the barb of the hook. Fig. 3 is a side elevation of Fig. 2.

At 1 I have shown a fish-hook of ordinary construction having a barb and point at 2 of the usual form and an eye or ring 3 for attaching the line at the opposite end of the hook.

A guard 4, which may be formed by bending ordinary wire in the form shown, may be placed in position over the barb and point of the hook and held in such a position by means of a rubber band 5 which is secured at one end to the eye or ring 3 of the hook and at the opposite end attached to the guard 4.

Guard 4, is formed of a piece of wire bent into a closed loop which latter is bent transversely central of its length as at *a*, to form a lower and an upper inclined member designated *b* and *c*, the former at its base engaging over the barb of the hook and having its sides projecting outwardly from the point of the hook, the hook point approximately alining with the said transverse bent portion of the loop. The upper member *b*, forms a shelf or shed which completely overlies the point of the hook thus not only protecting the latter but also acting as an abutment which when engaged by the head or mouth of the fish will be moved downwardly to disengage the loop from the barb.

The rubber band 5 is under tension when the guard is in the position shown and holds the same in such position until the hook is grasped by a fish when the same will be forced inwardly and readily and quickly displaced and drawn by the rubber band out of the way, allowing the hook to engage the fish, as shown in Fig. 1. Instead of the rubber band 5 any suitable resilient means may be used.

As many changes could be made in the above construction and many apparently widely different embodiments of my invention designed without departing from the scope thereof, I intend that all matter contained in the above description or shown in the accompanying drawings shall be interpreted as illustrative merely or an operative embodiment of my invention and not in a limiting sense.

What I claim is:—

In combination with a fish hook having a barb, a guard formed of a piece of wire bent into a closed loop, said loop being bent transversely central of its length to form an upper and a lower inclined member the end of which lower member engages over said barb and the sides of which project outwardly from the hook, the point of the hook alining with said transverse bent portion, said upper member constituting a shelf or shed which overlies the point of the hook and extends therebeyond and which protects said point and further acts as an abutment to be engaged by the mouth or head of the fish and moved downwardly thereby to free the lower member of said barb, and a rubber secured to the upper member and to the hook body.

Signed at Racine in the county of Racine and State of Wisconsin this 14th day of January A. D. 1907.

CHARLES R. CARPENTER.

Witnesses:
H. J. ROGERS,
J. G. KIDDLE.